Sept. 16, 1952 R. A. FIRMAN 2,610,887
BOMB SLIP AND ANALOGOUS RELEASABLE ATTACHMENT
Filed June 30, 1948

INVENTOR
Reginald A. Firman
By Watson, Cole, Grindle & Watson

Patented Sept. 16, 1952

2,610,887

UNITED STATES PATENT OFFICE 2,610,887

BOMB SLIP AND ANALOGOUS RELEASABLE ATTACHMENT

Reginald Arthur Firman, Weybridge, England, assignor to Vickers-Armstrongs Limited, London, England Application June 30, 1948, Serial No. 36,240
In Great Britain July 15, 1947

3 Claims. (Cl. 294—83)

The invention has reference to releasable attachments for use in conjunction with objects such as bombs, mail-bags supply containers or like articles intended to be dropped from aircraft, or for use in towing operations, and in other analogous operations such attachments being of the type exemplified by United States patent specification Serial No. 764,798/47 which comprises a pair of load-engaging pivoted jaws which are held in the engaged position by the presence of a movable stop between opposed bearing faces on cooperating parts of said jaws, and in which the arrangement is such that the load itself reacts to impose forces tending to disengage the jaws and to eject said stop from between them, locking mechanism being provided to impose a restraining force on said stop in a direction opposed to said ejective force, and means for releasing the stop to permit disengagement of the load. In the releasable attachment described in United States Patent specification Serial No. 764,798/47, the jaws are so arranged that the forces due to the load acting thereon are for the greater part balanced by opposed reactions in the jaws through the stop, the bearing surfaces of those parts of the jaws between which the stop is held being plane surfaces inclined to each other at an angle such as will, in normal working conditions, impose a slight ejective force on the stop.

It has been found that the formation of the stop-holding surfaces of the jaws so that they are uniplanar, i. e. that they are inclined to each other at a uniform angle over the entire working areas, gives satisfactory operation of the device in normal temperature conditions, but that when the attachment is used in intensely cold conditions the coefficients of friction of the metals of which the jaws and the stop are made may be increased to such an extent that the force imposed upon the stop by jaws whose surfaces are inclined at the angle appropriate to temperate conditions is insufficient to eject the stop when the latter is freed by the release mechanism and permit disengagement of the load. For example, when using jaws made of high tensile steel with the stop-holding faces inclined to each other at an included angle of 18°, such as would be suitable for satisfactory operation at normal atmospheric temperatures, a substantial lowering of the temperature requires a proportional increase in the relative inclination of the jaw surfaces between which the stop is held, until at a temperature of say —70° C. the minimum effective included angle is found to be of the order of 30°.

It will however be appreciated that an included angle of 30° would impose an ejective force upon the stop at normal temperatures such as to require a very considerably more robust construction of the parts of the locking and a more powerful releasing mechanism, resulting in greatly increased weight and bulk with self-evident disadvantages.

Having regard to the varying temperature conditions which may be encountered in practice, the object of the present invention is to provide means by which the disadvantages may be overcome without increasing weight or bulk of the parts, so as to render a given attachment capable of being operated effectively over the widest temperature range which is likely to be met with in the most severe working conditions.

It is accordingly proposed in accordance with this invention to fashion the opposed bearing surfaces of the jaws of a releasable attachment of the aforesaid type so that the included angle between them has one value at the points of contact of the surfaces with the stop when the latter is in the load-engaged position and a relatively larger value at the points of contact of the surfaces with the stop when the latter has been withdrawn slightly under the influence of the releasing means, the values of said angle at the two jaw positions being sufficient to produce a small ejective force on the stop at normal temperatures and at the lowest working temperatures respectively.

The result of this is that at normal temperatures a small ejective force acts continuously on the stop when in the load-engaged position, which force is resisted by the locking mechanism. As soon as the releasing means become effective the stop is ejected and when it has moved a small distance it reaches the point at which the included angle between the bearing surfaces has its greater value, when the ejective force increases and the ejection is accelerated. At the lowest working temperatures the coefficient of friction between the jaw faces and the stop is so great that there is no ejective force on the stop in the load-engaged position. When the release means become effective, however, a small impulse is transmitted to the stop, sufficient to withdraw it to the point at which the included angle between the bearing surfaces has its greater value, when friction is overcome and an ejective force is established which then ejects the stop.

Two embodiments of the invention will now be described by way of example with reference to the accompanying drawings, of which:

Figure 1:
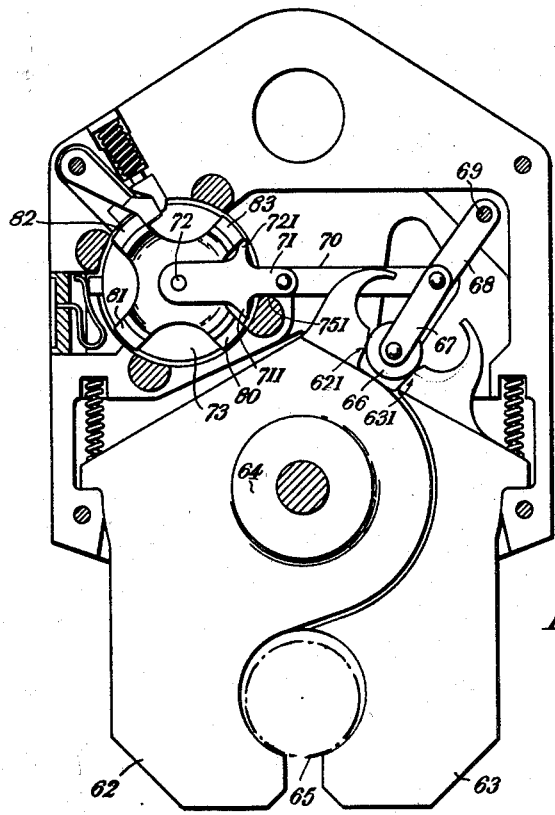
Figure 1 shows one construction in accordance with the invention as applied to a releasable attachment as described in United States patent specification Serial No. 764,800/47.

The attachment comprises two load-engaging jaws 62 and 63 mounted on a common pivot 64 and shaped to support a load suspended from a shackle 65. The reaction of the load tends to force the jaw tips apart and this is resisted by a roller-stop 66 inserted between opposed bearing faces 621 and 631. The bearing surfaces are inclined to one another so as, at normal temperatures to exert a small ejective force on the stop 66. The stop is mounted on one link 67 of a primary toggle 67, 68, the anchorage 69 of which resists the greater part of the ejective force. The remainder of the ejective force is resisted by a secondary toggle 70, 71 connected to the central pivot of the primary toggle and normally maintained in a braced position either against an abutment 751 as shown or by making the secondary toggle 70, 71 self-aligning. The link 71 of the secondary toggle is pivoted to the spindle 72 of a rotary actuator 72 having four poles 80, 81, 82 and 83. The link 71 is bifurcated as shown at 711 and 721 and when the actuator 73 is energized electromagnetically the pole 80 strikes the portion 711 of the link 71 causing both the toggles to collapse and to transmit a small impulse to the stop 66.

Figures 2, 3, 4:
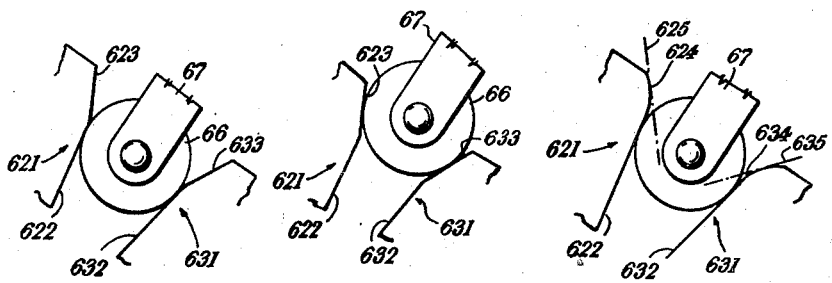
Figure 2 is a diagram showing, to an enlarged scale, the bearing surfaces of the attachment shown in Figure 1 with the stop in the load-engaged position.
Figure 3 is a diagram similar to Figure 2 showing the stop slightly withdrawn from the load-engaged position.
Figure 4 is a diagram similar to Figure 2 showing a modified construction with the stop in the load-engaged position.

As shown in Figures 1 to 3 the bearing surfaces 621 and 631 are each divided into two planes 622, 623 and 632, 633 respectively. As shown in the drawings the values of the included angles between the surfaces 622 and 632 and between the surfaces 623 and 633 have been exaggerated for greater clarity. Typical values of these angles are 18° and 30° when the surfaces are of high-tensile steel, with a minimum working temperature of −79° C., but it will be understood that they will be varied according to the materials used and the minimum working temperatures likely to be encountered.

In the load-engaged position, as shown in Figure 2, the stop is held between the surfaces 622 and 632. At normal temperatures these surfaces exert an ejective force on the stop so that it is ejected as soon as the toggles collapse, the ejection merely being accelerated when the stop moves into contact with the surfaces 623 and 633 as shown in Figure 3. At temperatures so low that there is no ejective force on the stop in the load-engaged position, the impulse transmitted through the toggle from the rotary actuator 73 is just sufficient, however, to withdraw the stop until it moves into contact with the surfaces 623 and 633 as shown in Figure 3. An ejective force is then developed and the release operation proceeds normally.

Figure 4 shows a modified construction of the bearing surfaces 621 and 631. In the load-engaged position the stop is again held between two plane surfaces 622 and 632. Instead, however, of an abrupt change of inclination these two surfaces merge into two smoothly curved convex surfaces 624 adn 634. The included angle between these surfaces increases steadily until, when the points of contact of the top coincide with the tangents 625, 635, said angle reaches a value equal to that of the included angle between the surfaces 623 and 633 in Figures 2 and 3. At the minimum working temperatures the stop is withdrawn by the impulse from the rotary actuator until its points of contact coincide with the tangents 625, 635 when the ejection proceeds as normally.

It will be appreciated that in both the aforedescribed embodiments of the invention the power of the toggle mechanism has its maximum value when the stop is in the region of the load-engaged position, so that the release mechanism will always be able to withdraw the stop through the short distance necessary to bring it into contact with the more widely inclined surfaces of the jaws.

What I claim as my invention and desire to secure by Letters Patent is:

1. A releasable attachment for aircraft comprising a pair of pivoted jaws having opposed bearing surfaces, a stop movably supported for insertion between said surfaces to maintain the jaws in load-engaging position and withdrawal therefrom to release the jaws from said position, and releasing means supporting said stop for retaining said stop between said surfaces and for imparting an impulse thereto in the direction of withdrawal thereof, the included angle between the opposed bearing surfaces of the jaws having one value at the points of contact of the surfaces with the stop when the latter is in the load-engaged position and a relatively larger value at the points of contact of the surfaces with the stop when the latter has been withdrawn slightly under the influence of the releasing means, the values of said angles at the two jaw positions being sufficient to produce a small ejective force sufficient to overcome the static friction acting on the top at normal temperature, and at the lowest working temperatures, respectively.

2. A releasable attachment according to claim 1, in which the two values of the said included angle result from the fact that each said bearing surface is divided into two planes inclined respectively at the requisite angles, the length of the first plane being sufficient to accommodate the stop in the load-engaged position and the stop proceeding to the second plane under the influence of the releasing means.

3. A releasable attachment according to claim 1, in which the bearing surfaces each take the form of a smooth convex curve between the points of contact with the stop when the latter is in the load-engaged position and when it has been moved slightly under the influence of the releasing means, the tangents to the surfaces at these two points being inclined at the requistie angles.

REGINALD ARTHUR FIRMAN.

REFERENCES CITED

The following references are of record in the file of this patent:

UNITED STATES PATENTS

| Number | Name | Date |
|---|---|---|
| 1,346,022 | Hassel | July 6, 1920 |
| 2,061,083 | Niemi | Nov. 17, 1936 |

FOREIGN PATENTS

| Number | Country | Date |
|---|---|---|
| 572,809 | Great Britain | Oct. 24, 1945 |